United States Patent
Sih et al.

(10) Patent No.: US 6,381,569 B1
(45) Date of Patent: *Apr. 30, 2002

(54) NOISE-COMPENSATED SPEECH RECOGNITION TEMPLATES

(75) Inventors: Gilbert C. Sih; Ning Bi, both of San Diego, CA (US)

(73) Assignee: Qualcomm Incorporated, San Diego, CA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/018,257

(22) Filed: Feb. 4, 1998

(51) Int. Cl.[7] .............................. G10L 15/20
(52) U.S. Cl. ...................... 704/233; 704/244
(58) Field of Search .................. 704/233, 243, 704/244, 226–228

(56) References Cited

U.S. PATENT DOCUMENTS

| | | | |
|---|---|---|---|
| 4,933,973 A | 6/1990 | Porter | 381/43 |
| 5,095,503 A | 3/1992 | Kowalski | 579/59 |
| 5,414,796 A | 5/1995 | Jacobs et al. | 395/2.3 |
| 5,646,991 A | 7/1997 | Sih | 379/410 |
| 5,778,342 A * | 7/1998 | Erell | 704/236 |
| 5,845,246 A * | 12/1998 | Schalk | 704/243 |

FOREIGN PATENT DOCUMENTS

| | | | |
|---|---|---|---|
| DE | 4340679 | 6/1995 | G10L/5/02 |
| EP | 0776097 | 5/1997 | H04B/1/38 |
| WO | 9809453 | 3/1998 | H04Q/7/22 |

OTHER PUBLICATIONS

1995 Computer Speech and Language, vol. 9, No. 4, "Robust Speech Recognition in Additive and Convolutional Noise Using Parallel Model Combination", M.J.F. Gales et al., pp. 289–307.

1995 Speech Communication, vol. 16, No. 3, "Speech Recognition in Noisy Environments: A Survey", Yifan Gong, pp. 261–291.

* cited by examiner

*Primary Examiner*—David D. Knepper
(74) *Attorney, Agent, or Firm*—Philip Wadsworth; Kent D. Baker; Thomas R. Rouse

(57) ABSTRACT

The speech recognition training unit is modified to store digitized speech samples into a speech database that can be accessed at recognition time. The improved recognition unit comprises a noise analysis, modeling, and synthesis unit which continually analyzes the noise characteristics present in the audio environment and produces an estimated noise signal with similar characteristics. The recognition unit then constructs a noise-compensated template database by adding the estimated noise signal to each of the speech samples in the speech database and performing parameter determination on the resulting sums. This procedure accounts for the presence of noise in the recognition phase by retraining all the templates using an estimated noise signal with similar characteristics as the actual noise signal that corrupted the word to be recognized. This method improves the likelihood of a good template match, which increases the recognition accuracy.

15 Claims, 3 Drawing Sheets

NOISE-COMPENSATED SPEECH RECOGNITION TEMPLATES

BACKGROUND OF THE INVENTION

I. Field of the Invention

The present invention relates to speech processing. More particularly, the present invention relates to a system and method for the automatic recognition of spoken words or phrases.

II. Description of the Related Art

Digital processing of speech signals has found widespread use, particularly in cellular telephone and PCS applications. One digital speech processing technique is that of speech recognition. The use of speech recognition is gaining importance due to safety reasons. For example, speech recognition may be used to replace the manual task of pushing buttons on a cellular phone keypad. This is especially important when a user is initiating a telephone call while driving a car. When using a phone without speech recognition, the driver must remove one hand from the steering wheel and look at the phone keypad while pushing the buttons to dial the call. These acts increase the likelihood of a car accident. Speech recognition allows the driver to place telephone calls while continuously watching the road and maintaining both hands on the steering wheel. Handsfree carkits containing speech recognition will likely be a legislated requirement in future systems for safety reasons.

Speaker-dependent speech recognition, the most common type in use today, operates in two phases: a training phase and a recognition phase. In the training phase, the speech recognition system prompts the user to speak each of the words in the vocabulary once or twice so it can learn the characteristics of the user's speech for these particular words or phrases. The recognition vocabulary sizes are typically small (less than 50 words) and the speech recognition system will only achieve high recognition accuracy on the user that trained it. An example of a vocabulary for a handsfree carkit system would include the digits on the keypad, the keywords "call", "send", "dial", "cancel", "clear", "add", "delete", "history", "program", "yes", and "no", as well as 20 names of commonly-called coworkers, friends, or family members. Once training is complete, the user can initiate calls in the recognition phase by speaking the trained keywords. For example, if the name "John" was one of the trained names, the user can initiate a call to John by saying the phrase "Call John." The speech recognition system recognizes the words "Call" and "John", and dials the number that the user had previously entered as John's telephone number.

A block diagram of a training unit 6 of a speaker-dependent speech recognition system is shown in FIG. 1. Training unit 6 receives as input s(n), a set of digitized speech samples for the word or phrase to be trained. The speech signal s(n) is passed through parameter determination block 7, which produces a template of N parameters $\{p(n)\ n=1\ldots N\}$ capturing the characteristics of the user's pronunciation of the particular word or phrase. Parameter determination unit 7 may implement any of a number of speech parameter determination techniques, many of which are well-known in the art. An exemplary embodiment of a parameter determination technique is the vocoder encoder described in U.S. Pat. No. 5,414,796, entitled "VARIABLE RATE VOCODER," which is assigned to the assignee of the present invention and incorporated by reference herein. An alternative embodiment of a parameter determination technique is a fast fourier transform (FFT), where the N parameters are the N FFT coefficients. Other embodiments derive parameters based on the FFT coefficients. Each spoken word or phrase produces one template of N parameters that is stored in template database 8. After training is completed over M vocabulary words, template database 8 contains M templates, each containing N parameters. Template database 8 is stored into some type of non-volatile memory so that the templates stay resident when the power is turned off.

FIG. 2 is a block diagram of speech recognition unit 10, which operates during the recognition phase of a speaker-dependent speech recognition system. Speech recognition unit 10 comprises template database 14, which in general will be template database 8 from training unit 6. The input to speech recognition unit 10 is digitized input speech x(n), which is the speech to be recognized. The input speech x(n) is passed into parameter determination block 12, which performs the same parameter determination technique as parameter determination block 7 of training unit 6. Parameter determination block 12 produces a recognition template of N parameters $\{t(n)\ n=1\ldots N\}$ that models the characteristics of input speech x(n). Recognition template t(n) is then passed to pattern comparison block 16 that performs a pattern comparison between template t(n) and all the templates stored in template database 14. The distances between template t(n) and each of the templates in template database 14 are forwarded to decision block 18, which selects from template database 14 the template that most closely matches recognition template t(n). The output of decision block 18 is the decision as to which word in the vocabulary was spoken.

Recognition accuracy is a measure of how well a recognition system correctly recognizes spoken words or phrases in the vocabulary. For example, a recognition accuracy of 95% indicates that the recognition unit correctly recognizes words in the vocabulary 95 times out of 100. In a traditional speech recognition system, the recognition accuracy is severely degraded in the presence of noise. The main reason for the loss of accuracy is that the training phase typically occurs in a quiet environment but the recognition typically occurs in a noisy environment. For example, a handsfree carkit speech recognition system is usually trained while the car is sitting in a garage or parked in the driveway, so the engine and air conditioning are not running and the windows are usually rolled up. However, recognition is normally used while the car is moving, so the engine is running, there is road and wind noise present, the windows may be down, etc. As a result of the disparity in noise level between the training and recognition phases, the recognition template does not form a good match with any of the templates obtained during training. This increases the likelihood of a recognition error or failure.

FIG. 3 illustrates a speech recognition unit 20 which must perform speech recognition in the presence of noise. As shown in FIG. 3, summer 22 adds speech signal x(n) with noise signal w(n) to produce noise-corrupted speech signal r(n). It should be understood that summer 22 is not a physical element of the system, but is an artifact of a noisy environment. The noise-corrupted speech signal r(n) is input to parameter determination block 24, which produces noise-corrupted template t1(n). Pattern comparison block 28 compares template t1(n) with all the templates in template database 26, which was constructed in a quiet environment. Since noise-corrupted template t1(n) does not exactly match any of the training templates, there is a high probability that the decision produced by decision block 30 may be a recognition error or failure.

SUMMARY OF THE INVENTION

The present invention is a system and method for the automatic recognition of spoken words or phrases in the presence of noise. Speaker-dependent speech recognition systems operate in two phases: a training phase and a recognition phase. In the training phase of a traditional speech recognition system, a user is prompted to speak all the words or phrases in a specified vocabulary. The digitized speech samples for each word or phrase are processed to produce a template of parameters characterizing the spoken words. The output of the training phase is a library of such templates. In the recognition phase, the user speaks a particular word or phrase to initiate a desired action. The spoken word or phrase is digitized and processed to produce a template, which is compared with all the templates produced during training. The closest match determines the action that will be performed. The main impairment limiting the accuracy of speech recognition systems is the presence of noise. The addition of noise during recognition severely degrades recognition accuracy, because this noise was not present during training when the template database was produced. The invention recognizes the need to account for the particular noise conditions that are present at the time of recognition to improve recognition accuracy.

Instead of storing templates of parameters, the improved speech processing system and method stores the digitized speech samples for each spoken word or phrase in the training phase. The training phase output is therefore a digitized speech database. In the recognition phase, the noise characteristics in the audio environment are continually monitored. When the user speaks a word or phrase to initiate recognition, a noise-compensated template database is constructed by adding a noise signal to each of the signals in the speech database and performing parameter determination on each of the speech plus noise signals. One embodiment of this added noise signal is an artificially-synthesized noise signal with characteristics similar to that of the actual noise. An alternative embodiment is a recording of the time window of noise that occurred just before the user spoke the word or phrase to initiate recognition. Since the template database is constructed using the same type of noise that is present in the spoken word or phrase to be recognized, the speech recognition unit can find a good match between templates, improving the recognition accuracy.

BRIEF DESCRIPTION OF THE DRAWINGS

The features, objects, and advantages of the present invention will become more apparent from the detailed description set forth below when taken in conjunction with the drawings in which like reference characters identify correspondingly throughout and wherein.

DETAILED DESCRIPTION OF THE PREFERRED EMBODIMENTS

This invention provides a system and method for improving speech recognition accuracy when noise is present. It takes advantage of the recent advances in computation power and memory integration and modifies the training and recognition phases to account for the presence of noise during recognition. The function of a speech recognition unit is to find the closest match to a recognition template that is computed on noise-corrupted speech. Since the characteristics of the noise may vary with time and location, the invention recognizes that the best time to construct the template database is during the recognition phase.

Figure 1:
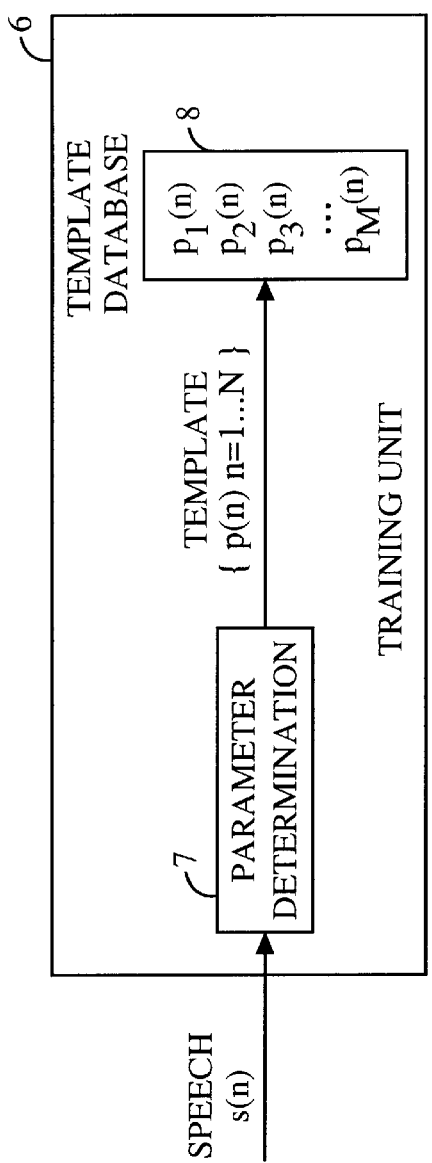
FIG. 1 is a block diagram of a training unit of a speech recognition system.
Figure 2:
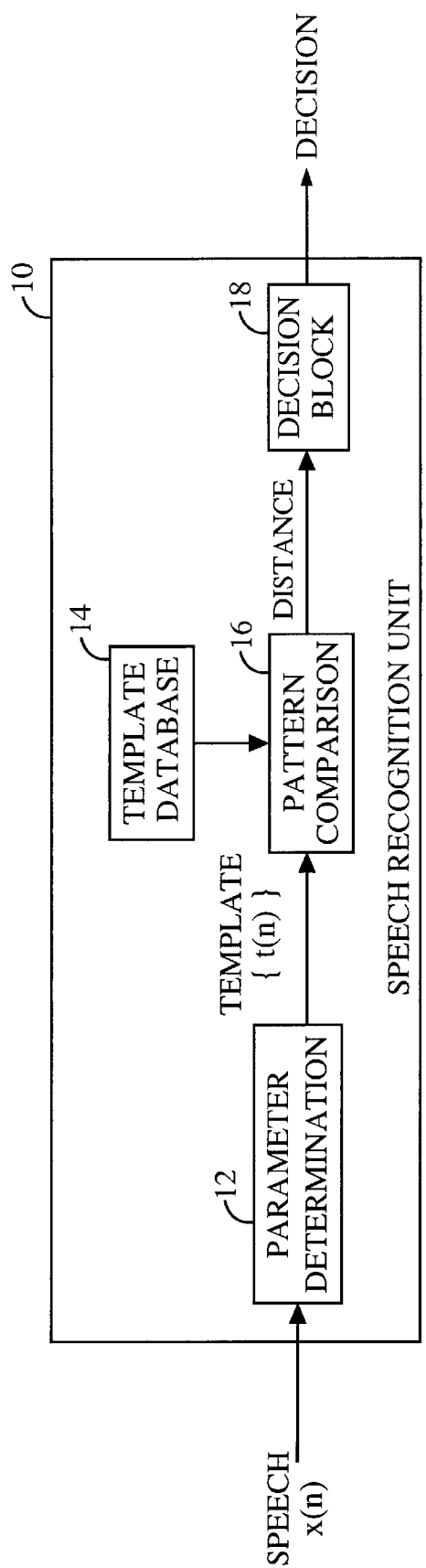
FIG. 2 is a block diagram of a speech recognition unit.
Figure 3:
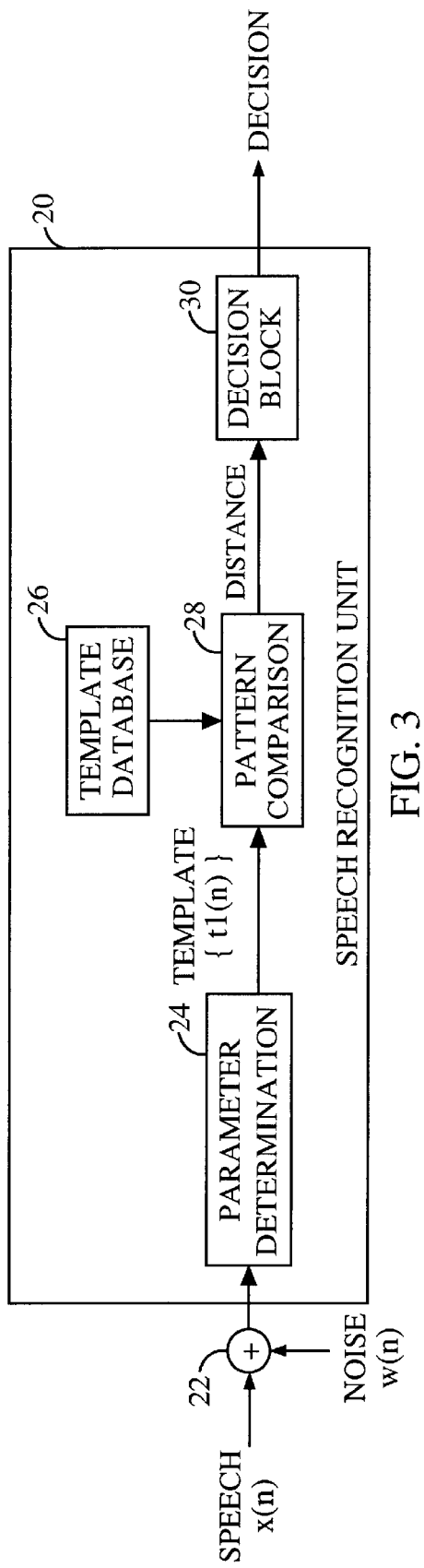
FIG. 3 is a block diagram of a speech recognition unit which performs speech recognition on a speech input corrupted by noise.
Figure 4:
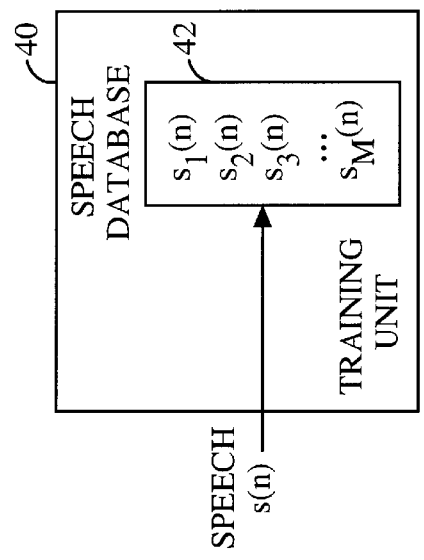
FIG. 4 is a block diagram of an improved training unit of a speech recognition system.

FIG. 4 shows a block diagram of an improved training unit 40 of a speech recognition system. As opposed to the traditional training method shown in FIG. 1, training unit 40 is modified to eliminate the parameter determination step. Instead of storing templates of parameters, digitized speech samples of the actual words and phrases are stored. Thus, training unit 40 receives as input speech samples s(n), and stores digitized speech samples s(n) in speech database 42. After training, speech database 42 contains M speech signals, where M is the number of words in the vocabulary. Whereas the previous system and method of performing parameter determination loses information about the speech characteristics by only storing speech parameters, this system and method may preserve all the speech information for use in the recognition phase.

Figure 5:
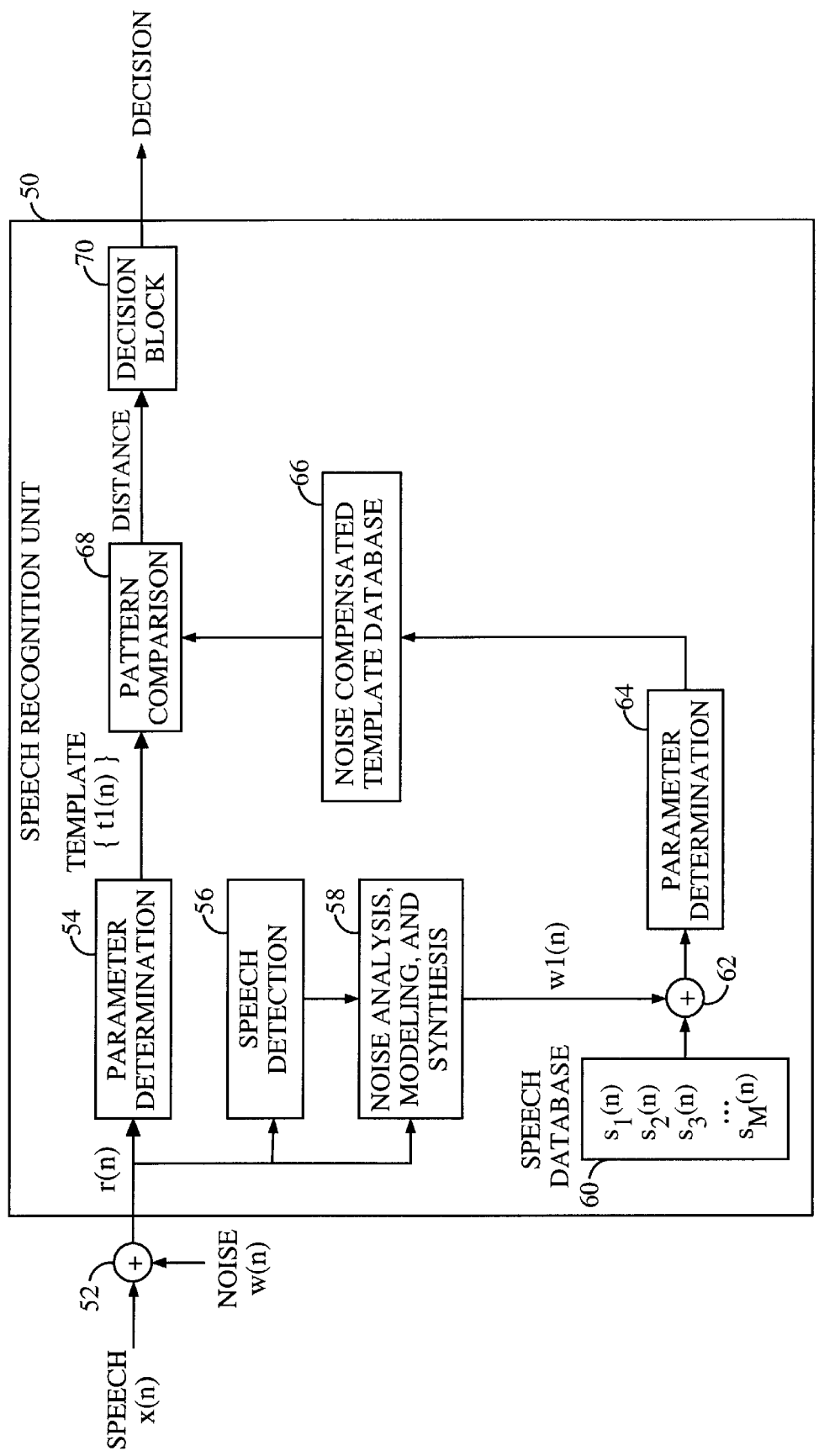
FIG. 5 is a block diagram of an exemplary improved speech recognition unit.

FIG. 5 shows a block diagram of an improved speech recognition unit 50 for use in conjunction with training unit 40. The input to speech recognition unit 50 is noise corrupted speech signal r(n). Noise-corrupted speech signal r(n) is generated by summer 52 adding speech signal x(n) with noise signal w(n). As before, summer 52 is not a physical element of the system, but is an artifact of a noisy environment.

Speech recognition unit 50 comprises speech database 60, which contains the digitized speech samples that were recorded during the training phase. Speech recognition unit 50 also comprises parameter determination block 54, through which noise-corrupted speech signal r(n) is passed to produce noise-corrupted template t1(n). As in a traditional voice recognition system, parameter determination block 54 may implement any of a number speech parameter determination techniques.

An exemplary parameter determination technique uses linear predictive coding (LPC) analysis techniques. LPC analysis techniques model the vocal tract as a digital filter. Using LPC analysis, LPC cepstral coefficients c(m) may be computed to be the parameters for representing the speech signal. The coefficients c(m) are computed using the following steps. First, the noise-corrupted speech signal r(n) is windowed over a frame of speech samples by applying a window function v(n):

$$y(n)=r(n)v(n) \quad 0<=n<=N-1 \quad (1)$$

In the exemplary embodiment, the window function v(n) is a hamming window and the frame size N is equal to 160. Next, the autocorrelation coefficients are computed on the windowed samples using the equation:

$$R(k) = \sum_{m=0}^{N-k} y(m)y(m+k) \quad k = 1, 2, \ldots, P \quad (2)$$

In the exemplary embodiment, P, the number of autocorrelation coefficients to be computed, is equal to the order of the LPC predictor, which is 10. The LPC coefficients are then computed directly from the autocorrelation values using Durbin's recursion algorithm. The algorithm may be stated as follows:

1. $E^{(0)}=R(0), i=1$      (3)

$$2.\ k_i = \left\{ R(i) - \sum_{j=1}^{i-1} \alpha_j^{(i-1)} R(i-j) \right\} \Big/ E^{(i-1)} \quad (4)$$

3. $\alpha_i^{(i)} = k_i$ (5)

4. $\alpha_j^{(i)} = \alpha_j^{(i-1)} - k_i \alpha_{i-j}^{(i-1)}$  $1 <= j <= i-1$ (6)

5. $E^{(i)} = (1 - k_i^2) E^{(i-1)}$ (7)

6. If i<P then goto (2) with i=i+1. (8)

7. The final solution for the LPC coefficients is given as $a_j = \alpha_j^{(P)}$
   $1 <= j <= P$ (9)

The LPC coefficients are then converted to LPC cepstral coefficients using the following equations:

$c(0) = \ln(R(0))$ (10)

$$c(m) = a_m + \sum_{k=1}^{m-1} \left(\frac{k}{m}\right) c_k a_{m-k} \quad 1 < = m < = P \quad (11)$$

$$c(m) = \sum_{k=1}^{m-1} \left(\frac{k}{m}\right) c_k a_{m-k} \quad m > P \quad (12)$$

It should be understood that other techniques may be used for parameter determination instead of the LPC cepstral coefficients.

In addition, the signal r(n) is passed to speech detection block 56 which determines the presence or absence of speech. Speech detection block 56 may determine the presence or absence of speech using any of a number of techniques. One such method is disclosed in the aforementioned U.S. Pat. No. 5,414,796, entitled "VARIABLE RATE VOCODER." This technique analyzes the level of speech activity to make the determination regarding the presence or absence of speech. The level of speech activity is based on the energy of the signal in comparison with the background noise energy estimate. First, the energy E(n) is computed for each frame, which in a preferred embodiment is composed of 160 samples. The background noise energy estimate B(n) may then calculated using the equation:

B(n)=min [E(n),5059644, max (1.00547*B(n−1), B(n−1)+1)]. (13)

If B(n)<160000, three thresholds are computed using B(n) as follows:

T1(B(n))=−(5.544613×10$^{-6}$)*B$^2$(n) +4.047152*B(n)+362 (14)

T2(B(n))=−(1.529733×10$^{-5}$)*B$^2$(n) +8.750045*B(n)+1136 (15)

T3(B(n))=−(3.957050×10$^{-5}$)*B$^2$(n) +18.89962*B(n)+3347 (16)

If B(n)>160000, the three thresholds are computed as:

T1(B(n))=−(9.043945×10$^{-8}$)*B$^2$(n) +3.535748*B(n)−62071 (17)

T2(B(n))=−(1.986007×10$^{-7}$)*B$^2$(n) +4.941658*B(n)+223951 (18)

T3(B(n))=−(4.838477×10$^{-7}$)*B$^2$(n) +8.630020*B(n)+645864 (19)

This speech detection method indicates the presence of speech when energy E(n) is greater than threshold T2(B(n)), and indicates the absence of speech when energy E(n) is less than threshold T2(B(n)). In an alternative embodiment, this method can be extended to compute background noise energy estimates and thresholds in two or more frequency bands.

Additionally, it should be understood that the values provided in Equations (13)–(19) are experimentally determined, and may be modified depending on the circumstances.

When speech detection block 56 determines that speech is absent, it sends a control signal that enables noise analysis, modeling, and synthesis block 58. It should be noted that in the absence of speech, the received signal r(n) is the same as the noise signal w(n).

When noise analysis, modeling, and synthesis block 58 is enabled, it analyzes the characteristics of noise signal r(n), models it, and synthesizes a noise signal w1(n) that has similar characteristics to the actual noise w(n). An exemplary embodiment for performing noise analysis, modeling, and synthesis is disclosed in U.S. Pat. No. 5,646,991, entitled "NOISE REPLACEMENT SYSTEM AND METHOD IN AN ECHO CANCELLER," which is assigned to the assignee of the present invention and incorporated by reference herein. This method performs noise analysis by passing the noise signal r(n) through a prediction error filter given by:

$$A(z) = 1 - \sum_{i=1}^{P} a_i z^{-i} \quad (20)$$

where P, the order of the predictor, is 5 in the exemplary embodiment. The LPC coefficients $a_i$, are computed as explained earlier using equations (1) through (9). Once the LPC coefficients are obtained, synthesized noise samples can be generated with the same spectral characteristics by passing white noise through the noise synthesis filter given by:

$$\frac{1}{A(z)} = \frac{1}{1 - \sum_{i=1}^{P} a_i z^{-i}} \quad (21)$$

which is just the inverse of the filter used for noise analysis. After applying a scaling factor to each of the synthesized noise samples to make the synthesized noise energy equal to the actual noise energy, the output is the synthesized noise w1(n).

The synthesized noise w1(n) is added to each set of digitized speech samples in speech database 60 by summer 62 to produce sets of synthesized noise corrupted speech samples. Then, each set of synthesized noise corrupted speech samples is passed through parameter determination block 64, which generates a set of parameters for each set of synthesized noise corrupted speech samples using the same parameter determination technique as that used in parameter determination block 54. Parameter determination block 54 produces a template of parameters for each set of speech samples, and the templates are stored in noise-compensated template database 66. Noise-compensated template database 66 is a set of templates that is constructed as if traditional training had taken place in the same type of noise that is present during recognition. Note that there are many possible methods for producing estimated noise w1(n) in addition to the method disclosed in U.S. Pat. No. 5,646,991. An alternative embodiment is to simply record a time window of the actual noise present when the user is silent and use this noise signal as the estimated noise w1(n). The time window of noise recorded right before the word or phrase to be recognized is spoken is an exemplary embodiment of this method. Still another method is to average various windows of noise obtained over a specified period.

Referring still to FIG. 5, pattern comparison block 68 compares the noise corrupted template t1(n) with all the templates in noise compensated template database 66. Since the noise effects are included in the templates of noise compensated template database 66, decision block 70 is able to find a good match for t1(n). By accounting for the effects of noise in this manner, the accuracy of the speech recognition system is improved.

The previous description of the preferred embodiments is provided to enable any person skilled in the art to make or use the present invention. The various modifications to these embodiments will be readily apparent to those skilled in the art, and the generic principles defined herein may be applied to other embodiments without the use of the inventive faculty. Thus, the present invention is not intended to be limited to the embodiments shown herein but is to be accorded the widest scope consistent with the principles and novel features disclosed herein.

We claim:

1. A speech recognition system, comprising:
   a training unit for receiving signals of words or phrases to be trained, generating digitized samples for each said words or phrases, and storing said digitized samples in a speech database; and
   a speech recognition unit for receiving an input signal to be recognized, the input signal being corrupted by noise, generating a noise compensated template database by applying the effects of said noise to said digitized samples of said speech database upon receiving said input signal, and providing a speech recognition outcome for said input signal based on said noise compensated template database,
   wherein said speech recognition unit comprises
      a speech detection unit for receiving said noise corrupted input signal and determining whether speech is present in said input signal, wherein said input signal is designated a noise signal when speech is determined not to be present in said input signal; and
      a noise unit activated upon determining that speech is not present in said input signal, said noise unit for analyzing said noise signal and synthesizing a synthesized noise signal having characteristics of said noise signal, said synthesized noise signal for applying the effects of noise to said digitized samples of said speech database.

2. The speech recognition system of claim 1, wherein said speech detection unit determines the presence of speech by analyzing the level of speech activity in said input signal.

3. The speech recognition system of claim 1, wherein said noise unit analyzes and synthesizes said synthesized noise signal using a linear predictive coding (LPC) technique.

4. The speech recognition system of claim 1, wherein said synthesized noise signal corresponds to a window of said noise signal recorded right before said input signal to be recognized.

5. The speech recognition system of claim 1, wherein said synthesized noise signal corresponds to an average of various windows of said noise signal recorded over a predetermined period of time.

6. The speech recognition system of claim 1 wherein said speech recognition unit further comprises:
   a first parameter determination unit for receiving said noise corrupted input signal and generating a template of parameters representative of said input signal in accordance with a predetermined parameter determination technique;
   a second parameter determination unit for receiving said speech database with the effects of noise applied to said digitized samples, and generating said noise compensated template database in accordance with said predetermined parameter determination technique; and
   a pattern comparison unit for comparing said template of parameters representative of said input signal with the templates of said noise compensated template database to determine the best match and thereby identify said speech recognition outcome.

7. The speech recognition system of claim 6, wherein said parameter determination technique is a linear predictive coding (LPC) analysis technique.

8. The speech recognition system of claim 6, wherein said speech detection unit determines the presence of speech by analyzing the level of speech activity in said input signal.

9. The speech recognition system of claim 6, wherein said noise unit analyzes and synthesizes said synthesized noise signal using a linear predictive coding (LPC) technique.

10. The speech recognition system of claim 6, wherein said synthesized noise signal corresponds to a window of said noise signal recorded right before said input signal to be recognized.

11. The speech recognition system of claim 6, wherein said synthesized noise signal corresponds to an average of various windows of said noise signal recorded over a predetermined period of time.

12. A speech recognition unit of a speaker-dependent speech recognition system for recognizing an input signal, said speech recognition unit accounting for effects of a noisy environment, comprising:
   means for storing digitized samples of words or phrases of a training vocabulary in a speech database;
   means for applying the effects of noise associated with said input signal to digitized samples of said training vocabulary to generate noise corrupted digitized samples of said training vocabulary;
   means for generating a noise compensated template database based on said noise corrupted digitized samples; and
   means for determining a speech recognition outcome for said input signal based on said noise compensated template database,
   wherein said means for applying effects of noise comprises
      means for determining whether speech is present in said input signal, wherein said input signal is designated a noise signal when speech is determined not to be present in said input signal; and
      means for analyzing said noise signal and synthesizing a synthesized noise signal, said synthesized noise signal added to said digitized samples of said vocabulary.

13. The speech recognition unit of claim 12, further comprising:
   first parameter determination means for receiving said input signal and generating a template of parameters representative of said input signal in accordance with a predetermined parameter determination technique; and
   second parameter determination means for receiving said noise corrupted digitized samples of said vocabulary and generating the templates of said noise compensated template database in accordance with said predetermined parameter determination technique,
   wherein said means for determining said speech recognition outcome compares said template of parameters representative of said input signal with the templates of said noise compensated template database to determine the best match and thereby identify said speech recognition outcome.

14. A method for speech recognition accounting for the effects of a noisy environment, comprising the steps of:

generating digitized samples of each word or phrase trained, each said word or phrase belonging to a vocabulary;

storing said digitized samples in a speech database;

receiving a noise corrupted input signal to be recognized;

applying the effects of noise associated with said input signal to said digitized samples of said vocabulary to generate noise corrupted digitized samples of said vocabulary, said applying being performed upon receiving said input signal;

generating a noise compensated template database based on said noise corrupted digitized samples; and providing a speech recognition outcome for said noise corrupted input signal based on said noise compensated template database;

wherein said step of applying the effects of noise comprises the steps of determining whether speech is present in said input signal, wherein said input signal is designated a noise signal when speech is determined not to be present in said input signal; and analyzing said noise signal and synthesizing a synthesized noise signal, said synthesized noise signal added to said digitized samples of said vocabulary to generate said noise corrupted digitized samples.

15. The method of speech recognition of claim 14, further comprising the steps of:

generating a template of parameters representative of said input signal in accordance with a predetermined parameter determination technique; and generating templates for said noise compensated template database in accordance with said predetermined parameter determination technique, wherein said step of providing a speech recognition outcome compares said template of parameters representative of said input signal with the templates of said noise compensated template database to determine the best match and thereby identify said speech recognition outcome.

* * * * *